April 28, 1936.    H. P. NEFF    2,038,667
CHEMICAL PROPORTIONING AND MIXING APPARATUS
Filed Jan. 26, 1935    4 Sheets-Sheet 1

Inventor
Herbert P. Neff,
By Richard K. Stevens
Attorney

April 28, 1936.　　　H. P. NEFF　　　2,038,667
CHEMICAL PROPORTIONING AND MIXING APPARATUS
Filed Jan. 26, 1935　　　4 Sheets-Sheet 2

Inventor
Herbert P. Neff,

By Richard K. Stevens
Attorney

April 28, 1936. H. P. NEFF 2,038,667
CHEMICAL PROPORTIONING AND MIXING APPARATUS
Filed Jan. 26, 1935 4 Sheets-Sheet 4

Inventor
Herbert P. Neff,

By Richard K. Stevens
Attorney

Patented Apr. 28, 1936

2,038,667

UNITED STATES PATENT OFFICE 2,038,667

CHEMICAL PROPORTIONING AND MIXING APPARATUS

Herbert P. Neff, Knoxville, Tenn.

Application January 26, 1935, Serial No. 3,657

5 Claims. (Cl. 210—29)

This invention relates to the art involving the dissolution or dispersion of a measured proportion of a solid material in a liquid. More particularly the invention relates to a new apparatus designed for the purpose of treating or purifying water by the addition thereto of a predetermined proportion of a solid purifying material, such as lime or alum or other chemical. Usually the chemical is added to a relatively small quantity of water, thoroughly dispersed or dissolved therein and the resultant solution or mixture thereafter added to the main body of water to be purified.

In the past various methods and numerous devices have been devised for the purpose of performing the operation of adding purifying substances to the smaller quantity of water. Two major difficulties, however, have interfered with the efficient operation of such devices. First, inaccuracies have occurred in the proportioning and the mechanisms have been complicated and delicate, and second, the solid material has not been properly dispersed in the liquid. As the substances used in water purification are often but sparingly soluble, the ability of the mechanism to thoroughly disperse and effect the dissolving of the purifying material is of vital importance.

Accordingly, it is a primary purpose of the present invention to provide a machine of simple, sturdy construction, that will accurately proportion the solid material to the liquid and thereafter so thoroughly disperse the material in a small portion of the liquid as to promote rapid and complete solution. In addition, the new machine is arranged so that it may be used with various solid materials and may be readily changed for feeding solid materials of different strengths and densities. Thus with the machine set to operate for feeding alum to the water it may be changed by simply filling the hopper with lime and making one simple adjustment so that lime will be supplied in place of alum in the same weight proportion without further adjustment or changing of the machine. Furthermore, the machine may be adjusted in an extremely simple manner to feed any desired proportion of the material to the water.

In a general way the new apparatus comprises a variable speed screw conveyor for feeding and measuring the solid material; a movable member for adjusting the capacity of the conveyor at any given speed, primarily to compensate for the use of different kinds of solid material so that an equivalent proportion may be fed even though the kind or composition of the material is changed and means for mixing the measured solid material with a quantity of liquid sufficient to carry the material into the main body of liquid. Additional details of this mechanism and further advantages thereof will appear from a consideration of the machine illustrated in the drawings when considered in connection with the following description.

In the drawings Fig. 1 is a side elevation of the preferred form of machine constructed according to the principles of this invention;

Figure 10:
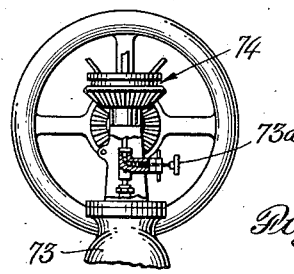
Figure 2:
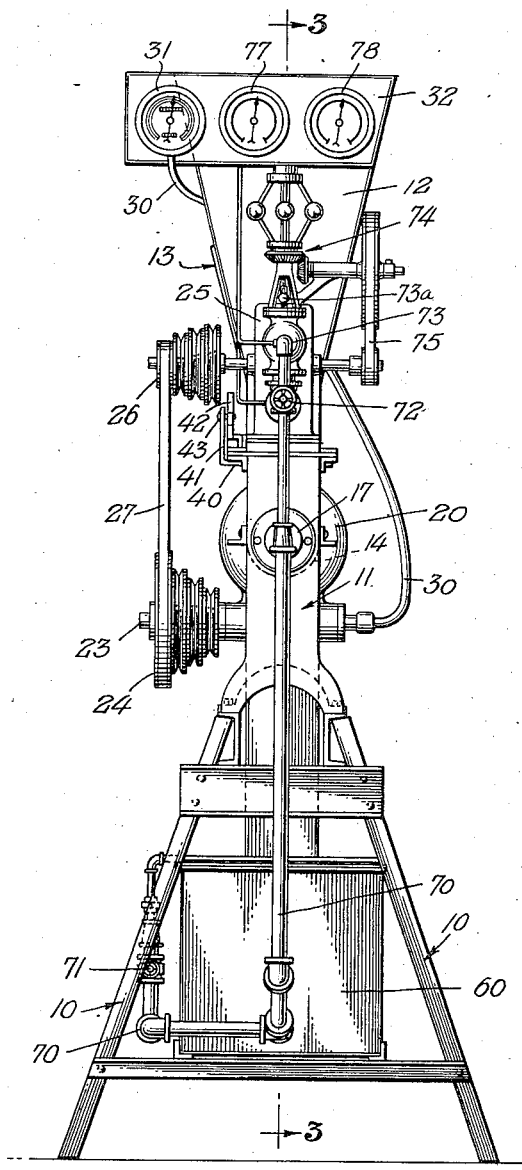
Fig. 2 is an end elevation of the same machine.
Figure 9:
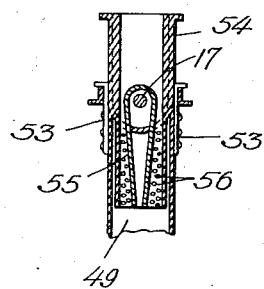
Figure 11:
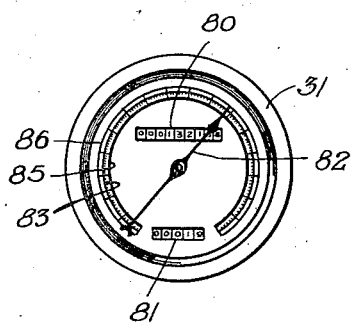
Figure 3:
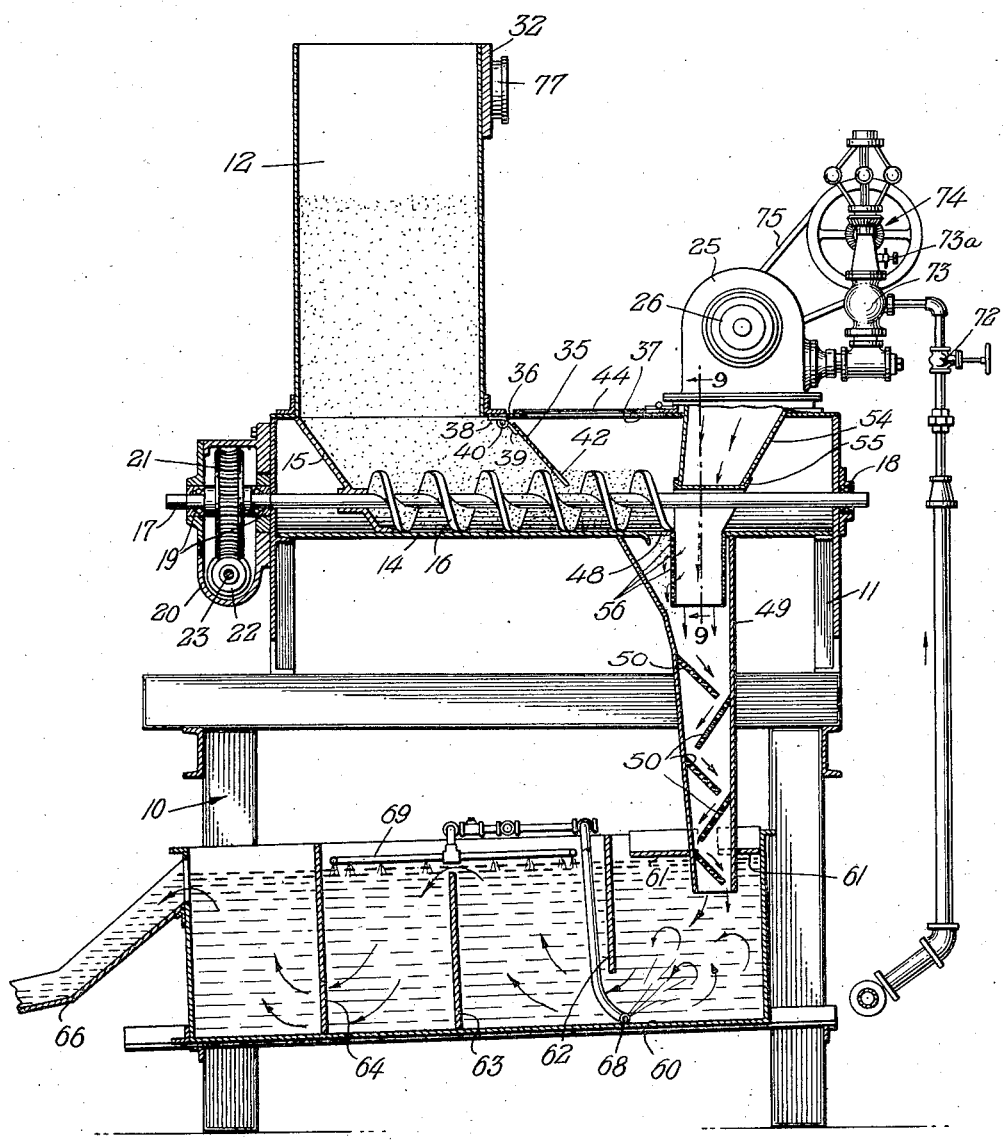
Fig. 3 is a sectional view of the machine taken on lines 3—3 of Fig. 2.
Figure 4:
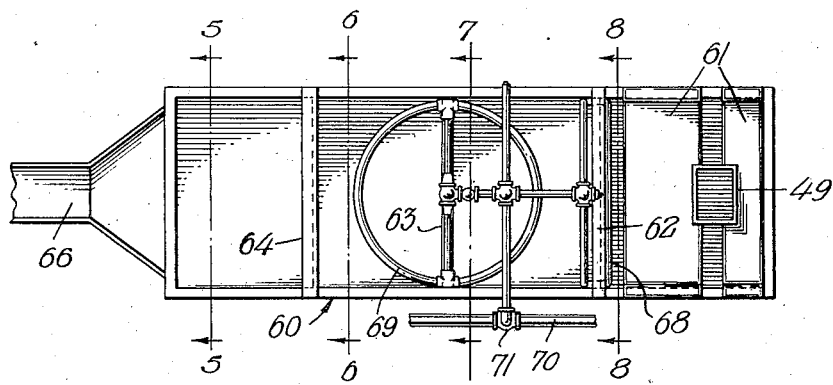
Fig. 4 is a top plan view of the mixing tank.
Figure 5:
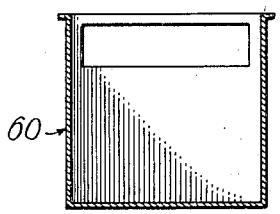

Figs. 5 to 8 inclusive are detailed sectional views of the mixing tank taken on lines 5—5, 6—6, 7—7, and 8—8, respectively, of Fig. 4;

Fig. 9 is a detailed sectional view through a part of the machine taken on line 9—9 of Fig. 3;

Fig. 10 is an enlarged detail view of the machine partly in action showing the means for controlling the operation of the governor; and Fig. 11 is a face view of the meter employed in connection with the machine to designate the rate of feed of the material to the water and to show the quantity of material delivered during certain periods.

While the machine illustrated in the accompanying drawings is the preferred embodiment, it is to be understood that considerable variation is possible and that machines differing in detail but involving the general principles of this invention are equally within the scope thereof.

As illustrated the new machine is built upon a main frame 10 upon which is supported a smaller or subframe 11. The dry or solid chemical is originally stored in a hopper or bin 12 which rests on top of the subframe 11, the hopper being open at the bottom and having a door 13 through which access may be had to its interior. Under the bin, in a position to receive solid material therefrom, is a horizontally positioned trough 14 also carried by the subframe 11. A deflecting plate 15 mounted in the trough deflects the material onto a conveyor screw 16 carried on a shaft 17, and extending along the bottom of the trough.

The shaft 17 is supported at opposite ends in ball bearings 18 and 19. At one end of the shaft the bearing 18 is carried by the subframe 11 while at the other end of the shaft there are two aligned bearings 19 mounted in a gear case 20, the gear case being in turn supported upon the subframe.

In the gear case between the two bearings 19, the shaft 17 carries a worm wheel 21 meshing with a worm gear 22 carried by a shaft 23 also mounted in bearings in the gear case. One end of the shaft 23 extends out through the wall of the gear case and has fixed to its outer end a multiple pulley 24 having a plurality of belt grooves of progressively larger radius towards the end of the shaft.

The pulley 24 is driven by a liquid motor 25 mounted upon the top of the subframe 11 near the opposite end of the machine. The shaft of the motor has a pulley 26, fixed thereon and while pulley 26 is similar to the first mentioned pulley 24, it is mounted so that the radius of the respective grooves becomes progressively smaller toward the end of the motor shaft. The two pulleys 24 and 26 are connected by a belt 27, which may be shifted from one pair of grooves to another to vary the driving ratio between the pulleys.

The worm gear shaft 23 at the end opposite the pulley 24 drives an enclosed flexible drive 30 of the type ordinarily used on speedometers and the like. This drive serves to connect the shaft to a combined tachometer and revolution counter 31 carried by an instrument panel 32 mounted for convenience upon the side of the hopper 12. The tachometer is calibrated to indicate in terms of pounds per hour the material fed by the conveyor and the revolution counter, which has both a total revolution counter and a revolution counter which is resetable at zero at the beginning of each run, is calibrated so that both of these readings are in pounds of material fed by the conveyor.

Figure 1:
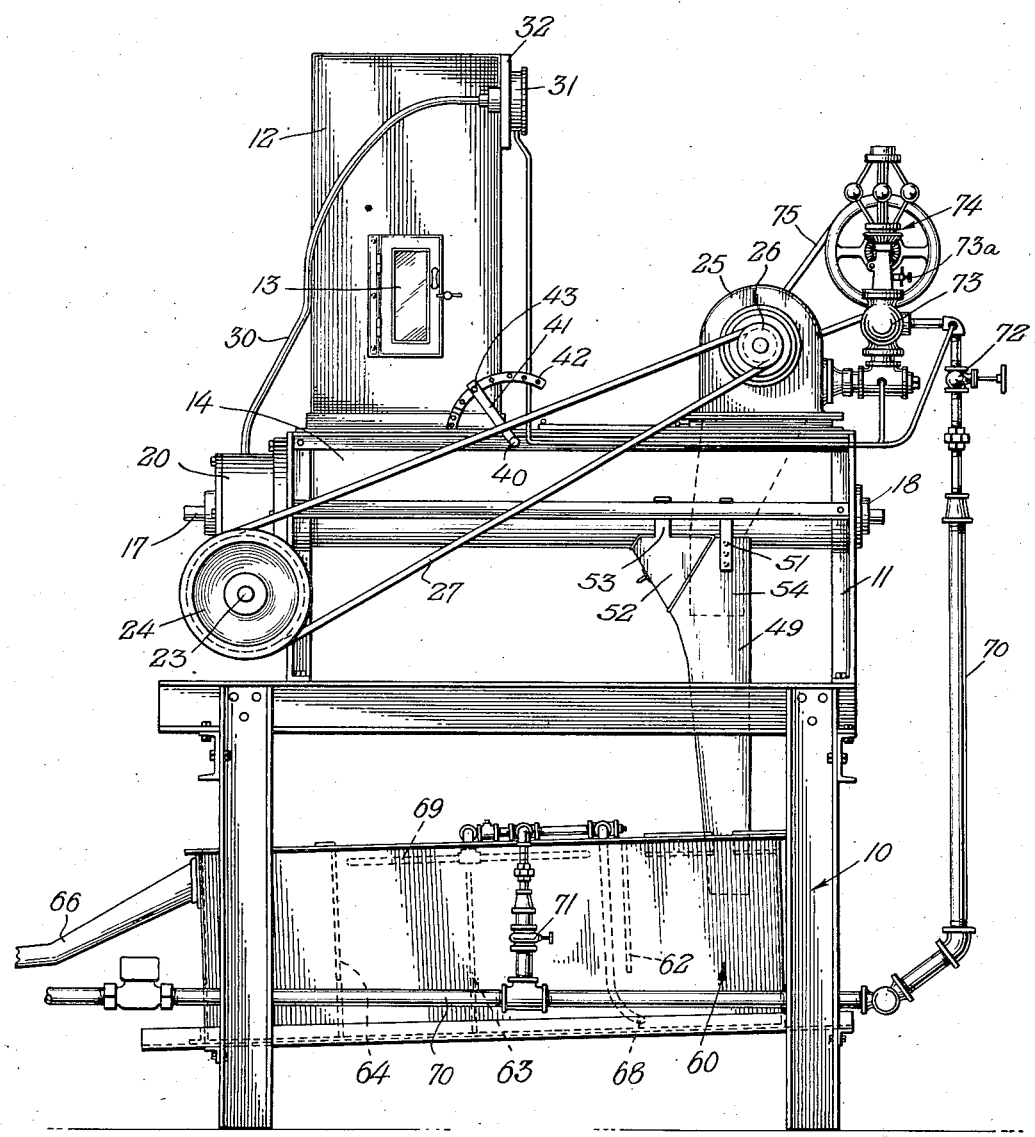

Inside the trough member 14 the plate 15 deflects the solid material from the hopper 12 onto the conveyor 16 which moves the material from left to right as shown in Figs. 1 and 3. Over this conveyor screw 16 and just to the right of the hopper is located a regulating plate 35 pivotally connected at its upper end by means of a hinge 36 to a plate 37 that forms a cover for the trough member 14. The regulating plate is so mounted that it extends across the conveyor trough 14. As it pivots on the hinge 36, the lower end of the plate swings up and down, away from and toward the conveyor screw. Naturally, the conveyor screw, if not prevented from so doing, will carry not only the material in its convolutions, but also a very considerable amount of material stacked on top of the screw. The regulating plate operates to prevent the passage of this excess material, in whole or in part, and hence regulates the total amount of material conveyed, within, of course, certain fixed limits. The hinge 36 comprises two wings 38 and 39, one wing 38 being fastened to the cover plate 37 and the other wing 39 being fastened to the regulating plate 35. The latter wing 39 is also rigidly fixed to a shaft 40 which is rotatably held in the other wing and projects through the wall of the trough 14 and through the subframe 11 to the outside of the machine where a manually operable lever 41 is fixed non-rotatably to it.

An arcuate member 42 fastened to the subframe and having openings to receive a spring pressed pin 43 in the lever 41 provides means for holding the lever, and hence the regulating plate, in the position in which they are manually set. The regulating plate at its lower end 42 has an arcuate section cut away so that the plate will fit quite closely around the conveyor screw when in lowered position to substantially reduce the amount of material conveyed by the screw.

The cover 37 for the trough 14 completely covers the top of the trough but is cut away under the hopper 12 so that material from the hopper may freely enter the trough and be deflected onto the conveyor. Also, the cover 37 has an opening under the liquid motor 25, and a door 44 between the hopper and the motor, for inspection and cleaning of the conveyor and regulating plate.

Approximately under the liquid motor 25 an opening 48 is provided in the bottom of the trough 14 and through this opening the solid material carried by the conveyor is dropped. Surrounding this opening and extending downwardly therefrom in a substantially vertical direction is a chute 49 containing perforated baffles 50, angularly disposed in zig-zag fashion. The main portion of the chute is supported from the subframe by a pair of hooked straps 51. A supplemental portion 52 of the chute is arranged to be removable, so that the machine can be easily inspected or cleaned and this portion is supported from the subframe by an additional pair of straps 53.

As the solid material is dropped down the vertical chute 49 liquid is added thereto so that the initial mixing occurs in this chute. The liquid used for this purpose is the effluent from the motor 25. This liquid is conveyed into the upper end of the chute 49 by a tapered spout 54 extending from the bottom of the motor through the trough 14 and into the top end of vertical chute 49. In order to avoid the shaft 17 of the spiral conveyor, the spout 54 is divided so that it straddles the shaft and an inner wall 55 is provided within the spout to keep the liquid from the shaft. Near the lower end of the spout and on the side toward the material being discharged into the vertical chute by the conveyor, perforations 56 are provided in the spout so that some of the liquid therein will pass out into the vertical chute and prevent the solid material from clogging as it enters the chute. The remainder of the liquid passes into the chute through the open lower end of the spout.

Figure 6:
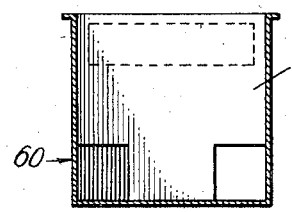
Figure 7:
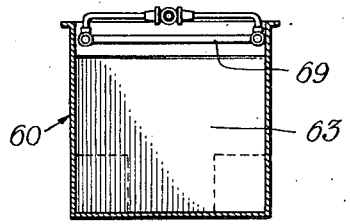
Figure 8:
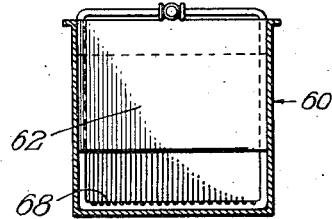

As the mixture of liquid and solid material passes over and through the perforated baffles and leaves the vertical chute, it enters a baffle tank 60 mounted on the main frame 10 and gently sloping toward the discharge end. The tank contains a pair of splash baffles 61 adjacent to the point where the vertical chute enters the baffle tank, and a series of baffles 62, 63 and 64 alternately extending downward from the top of the tank and upward from the bottom of the tank. In the present device there are three such baffles and the shape of these baffles can be seen by reference to Figs. 6, 7 and 8. The baffle closest to the point where the mixture enters the tank, as shown in Fig. 8, is rectangular in form, extends from the top of the tank downward and leaves a rectangular opening for the mixture of solid material and liquid near the bottom of the tank. The second baffle 63, shown in Fig. 7, is also rectangular but in this case extends from the bottom and leaves the opening for the mixture near the top of the tank. The third baffle 64, shown in Fig. 6, is somewhat different in shape, extending completely to the bottom, top and sides of the tank, but having the two lower corners removed to form two square openings through which the mixture may flow. At the discharge end of the tank a rectangular discharge opening and a spillway 66 are provided near the upper edge of the tank. From the spillway the solution or mixture may be taken for admixture with a large quantity of liquid or may be used without the addition of further liquid.

Because of the position of the baffles and of the inlet and discharge openings the mixture is caused to flow in a tortuous path which promotes rapid and thorough mixing and solution of the solid material in the liquid. As an additional aid to the mixing action of the baffles a small quantity of liquid under comparatively high pressure is sprayed into the tank through a perforated pipe 68 which extends across the bottom of the tank just in advance of the first baffle 62 and through a loop of perforated pipe 69 that lies horizontally above the center baffle 63. Suitable connections supplying liquid to these pipes from a main liquid supply pipe 70 are provided and a valve 71 is placed in these connections for adjusting the amount of liquid entering the baffle tank through the sprays.

The main supply pipe 70 supplies liquid not only to the spray pipes but also to the liquid motor through a manually controlled valve 72 and a governor controlled valve 73. The governor 74 that controls the valve 73 is of the ordinary fly-ball type and is driven by a belt 75 from the liquid motor 25. The governor valve stem is divided and may be increased or decreased in length by the manual adjusting screw 73a as shown in Fig. 10 thereby producing a wide range in the adjustment of motor speeds. By adjusting the governor 74 by means of the screw 73a the rate of speed of the motor may be varied and controlled over a certain range and this in turn controls over that same range the rate of operation of the whole device, since it controls the rate of operation of the screw conveyor and also the rate at which liquid is discharged from the motor.

Since the device is ordinarily used for preliminary mixing solid material and liquid which are afterward to be added to larger quantities of liquid, a change in the rate of operation of the device can be used to effect a change in the proportion of solid material added to the final body of liquid. Thus with the belt 27 set in the pair of grooves which drive the conveyor slowest in relation to the motor speed the motor speed may be adjusted to adjust the rate of feed of the conveyor to a limited extent but the rate is necessarily low because of the belt setting. As the belt is shifted the rate at which the conveyor will feed is changed but is still adjustable to a limited extent by adjusting the speed of the motor. Thus means for a rough adjustment are provided by the belt and pulleys while the final adjustment may be accurately made by setting the governor 74 which controls the motor.

In order that the operation of the motor may be checked by the operator, two pressure gauges 77 and 78 are mounted on the instrument panel 32 and connected to the liquid supply line on opposite sides of the governor controlled valve. The gauges thus give an indication of the line pressure and of the pressure on the motor.

To operate the new machine the bin 12 is supplied with the chemical which it is desired to add to the water and the lever 41 controlling the regulating plate 35 is set in accordance with the chemical in the bin. If the specific gravity of the material in the bin is high the regulating plate may be set closely against the conveyor screw and vice versa, thus compensating for the difference by changing the capacity of the conveyor. The various holes in the arcuate section 42 may be designated for different chemicals to facilitate this setting of the lever and regulating plate. The belt 27 which connects the liquid motor to the driving mechanism of the conveyor is next set in the proper pair of grooves to give approximately the desired rate of feed of the solid material. A hand valve 72 in the liquid supply line is thereafter opened and the governor adjusting screw 73a is set to give the desired rate of speed of the motor and thus the desired rate of feed of solid through the machine and the desired ratio between solid and liquid to which it is eventually added. As liquid enters the motor and is discharged therefrom into the vertical chute 49 the conveyor is driven to supply solid material to this same chute. The mixture passes over the perforated baffles through the chute and into the baffle tank, the valve 71 is opened to supply liquid to the spray pipes 68 and 69 and the machine is in operation. When it is desired to change the rate of feed of solid by a small amount it is but necessary to screw in or out on the adjusting screw 73a, the required amount as the occasion demands. If, however, it is desired to change the proportion of solid to liquid by a large amount, that is to change the rate of feed of solid by a large amount it is then necessary to move the belt 27 upon the pulleys 24 and 26. If it is desired to change the substance being added to the liquid, it is but necessary to supply the new substance to the bin 12 and reset the lever 41.

As shown in Fig. 11 the meter 31 indicates at 80 the total number of pounds of material fed from the bin 12. The meter also has a second indication at 81 of the number of pounds of material fed, but this latter indication may be reset to zero in the manner of the trip-meter in an automobile speedometer so as to indicate only the number of pounds fed in any one run of the machine rather than the total number of pounds fed. A needle 82 pivoted at the centre of the meter dial is movable to indicate upon the scale 83 the number of pounds per hour of material being fed by the machine.

As the meter and all of its readings depend entirely upon the number or speed of the rotations of the conveyor shaft it is immediately apparent that the readings will not be correct, and furthermore, the proportion of solid material to liquid will not be constant, unless the amount of material fed by the conveyor per revolution is constant. As the specific gravity and perhaps other characteristics of the material being fed may effect this amount some compensation must be made to balance the effect of changes in these characteristics of the chemicals which may be fed by the conveyor. This compensation is effected by the regulating plate 35 which may be set to restrict the capacity of the conveyor more or less to compensate for the change. With the regulating plate 35 properly set the meter 31 will read directly in pounds and in pounds per hour, or in some other equivalent terms.

Should it be desired for some reason to feed an unusually large or unusually small amount of solid material in proportion to the liquid, the regulating plate may be adjusted specially so that, for example, the conveyor will feed twice as much or half as much as is indicated by the meter. If this is done the total quantity registered on the meter must be divided or multiplied by the appropriate factor to determine the correct amount. However, by the provision of additional scales 85 and 86 on the dial face, one or the other of these scales may often be used in conjunction with the needle to read the rate of feed directly.

From the foregoing explanation the principles of this invention as well as the details of the specific machine described will be understood. These principles may be applied not only to the specific machine herein described, but also to the construction of other machines involving the same basic principles and operated in the same general manner. For example, an electric motor may replace the liquid pressure motor for driving the conveyor. In such a case other means must be provided for supplying liquid for mixing with the solid material and a liquid spray device may be directed into the top of the spout 54 or the vertical chute 49. The amount of liquid thus supplied may be controlled by a valve or other means. Because of the possibility of these and other modifications, it is to be understood that the invention is limited only in the scope of the appending claims.

What I claim is:

1. In a device of the class described, a conveyor for solid material, a hopper for supplying solid material to the conveyor, means for driving the conveyor, means for supplying liquid at a predetermined rate, means for mixing the liquid with the material conveyed by the conveyor, said means comprising a substantially vertical chute containing baffles and through which the mixture is permitted to fall, a baffle containing tank through which the mixture is flowed, and at least one means for spraying additional liquid into said tank.

2. In a device of the class described, which includes a liquid pressure motor, a conveyor for solid material and means for mixing the effluent from the motor with the solid material, the combination of a vertical chute into which the solid and liquid are separately projected and permitted to fall and mix, with a series of perforated baffles arranged in staggered relation within the chute to accelerate the mixing.

3. In a device of the class described, means for feeding solid material at a predetermined rate comprising a conveyor trough to which the solid material is fed at one point and from which it is discharged at another, a conveyor screw in the bottom of the trough and spaced from the top thereof for moving the solid material from the point of feed to the point of discharge and means between the point of feed and the point of discharge to adjustably restrict the amount of solid material carried along the trough by the conveyor screw, said means comprising a pivoted plate mounted on an axis extending laterally of the conveyor and pivotable to at least partially block the trough above the conveyor screw between the point of feed and the point of discharge.

4. In a device of the class described, means for feeding solid material at a predetermined rate comprising a conveyor trough to which the solid material is fed at one point and from which it is discharged at another, a conveyor screw in the bottom of the trough and spaced from the top thereof for moving the solid material from the point of feed to the point of discharge and means between the point of feed and the point of discharge to adjustably restrict the amount of solid material carried along the trough by the conveyor screw, said means comprising a plate pivoted at one edge on an axis extending laterally of the conveyor and having the other edge concave to fit around the upper part of the conveyor screw, said plate being pivotable to at least partially block the trough above the conveyor screw between the point of feed and the point of discharge.

5. A device of the class described comprising means for feeding solid and liquid materials into confluence in predetermined proportions, a vertical chute containing perforated baffles through which the liquid and solid materials fall in confluence and are mixed, and a horizontal baffle tank through which the liquid and solid mixture flow upon leaving the vertical chute to complete the mixing.

HERBERT P. NEFF.